United States Patent
Hermann et al.

(10) Patent No.: US 9,839,265 B2
(45) Date of Patent: *Dec. 12, 2017

(54) GROUND COMPOSITE BODY COMPRISING A GLASS BODY AND A PLASTIC

(71) Applicant: D. Swarovski KG, Wattens (AT)

(72) Inventors: Walter Hermann, Terfens (AT); Adolf Stocker, St. Ulrich am Pillersee (AT); Max Schural, Buch (AT); Christian Mur, Terfens (AT)

(73) Assignee: D. Swarovski KG (AT)

( * ) Notice: Subject to any disclaimer, the term of this patent is extended or adjusted under 35 U.S.C. 154(b) by 495 days.

This patent is subject to a terminal disclaimer.

(21) Appl. No.: 14/264,405

(22) Filed: Apr. 29, 2014

(65) Prior Publication Data
US 2014/0233236 A1 Aug. 21, 2014

Related U.S. Application Data

(63) Continuation of application No. 12/729,425, filed on Mar. 23, 2010, now Pat. No. 8,783,928.

(30) Foreign Application Priority Data

Mar. 26, 2009 (AT) .................................. A 484/2009

(51) Int. Cl.
*A44C 1/00* (2006.01)
*A44C 17/00* (2006.01)
(Continued)

(52) U.S. Cl.
CPC .......... *A44C 17/002* (2013.01); *A44C 27/001* (2013.01); *A44C 27/007* (2013.01);
(Continued)

(58) Field of Classification Search
CPC ............ A44C 27/007; B29C 45/14434; B29C 66/7465
(Continued)

(56) References Cited

U.S. PATENT DOCUMENTS 2,596,965 A * 5/1952 Troy ...................... D06C 29/00
156/280
3,097,080 A * 7/1963 Weir ...................... B29C 67/243
156/61
(Continued)

FOREIGN PATENT DOCUMENTS

DE 35 03 941 8/1986
DE 295 19 925 4/1996
(Continued)

OTHER PUBLICATIONS

Austrian Search Report dated Jan. 18, 2010 in corresponding Austrian Application No. 484/2009.
(Continued)

*Primary Examiner* — Sean Gramling
(74) *Attorney, Agent, or Firm* — Stevens & Showalter, LLP

(57) ABSTRACT

A decorative composite body includes a glass body and a plastic partly enclosing the glass body, wherein part of the surface of the glass body is arranged on the outside of the decorative composite body, wherein at least two adjacent glass and plastic areas arranged on the outside of the composite body are ground in the composite state, wherein areas of the glass body adjacent to the plastic are at least partly mirrored.

20 Claims, 8 Drawing Sheets

(51) Int. Cl.
- *B29C 45/14* (2006.01)
- *A44C 27/00* (2006.01)
- *B29C 65/00* (2006.01)
- *B29C 39/00* (2006.01)
- *B29C 39/10* (2006.01)
- *B44C 3/00* (2006.01)
- *B44C 5/04* (2006.01)
- *B29C 70/68* (2006.01)
- *F21V 33/00* (2006.01)
- *A44C 15/00* (2006.01)
- *B29L 31/00* (2006.01)

(52) U.S. Cl.
CPC ............ *B29C 39/006* (2013.01); *B29C 39/10* (2013.01); *B29C 45/14434* (2013.01); *B29C 66/7465* (2013.01); *B29C 70/68* (2013.01); *B44C 3/005* (2013.01); *B44C 5/0407* (2013.01); *F21V 33/00* (2013.01); *A44C 15/0015* (2013.01); *B29L 2031/7432* (2013.01); *Y10T 428/22* (2015.01)

(58) Field of Classification Search
USPC ................................ 362/571, 311.03, 311.05
See application file for complete search history.

(56) References Cited

U.S. PATENT DOCUMENTS

| | | | |
|---|---|---|---|
| 4,262,497 A | 4/1981 | Morris et al. | |
| 4,755,921 A | 7/1988 | Nelson | |
| 6,637,924 B2 * | 10/2003 | Pelka | F21S 48/2237 362/327 |
| 8,783,928 B2 | 7/2014 | Hermann | |
| 2008/0173045 A1 | 7/2008 | Turner | |
| 2009/0027895 A1 | 1/2009 | Daimon et al. | |

FOREIGN PATENT DOCUMENTS

| | | |
|---|---|---|
| DE | 203 11 998 | 1/2004 |
| EP | 0 003 174 | 7/1979 |
| EP | 0 462 491 | 12/1991 |
| WO | 00/77085 | 12/2000 |

OTHER PUBLICATIONS

European Search Report dated May 11, 2016 in corresponding European Patent Application No. 10 00 2946.

* cited by examiner

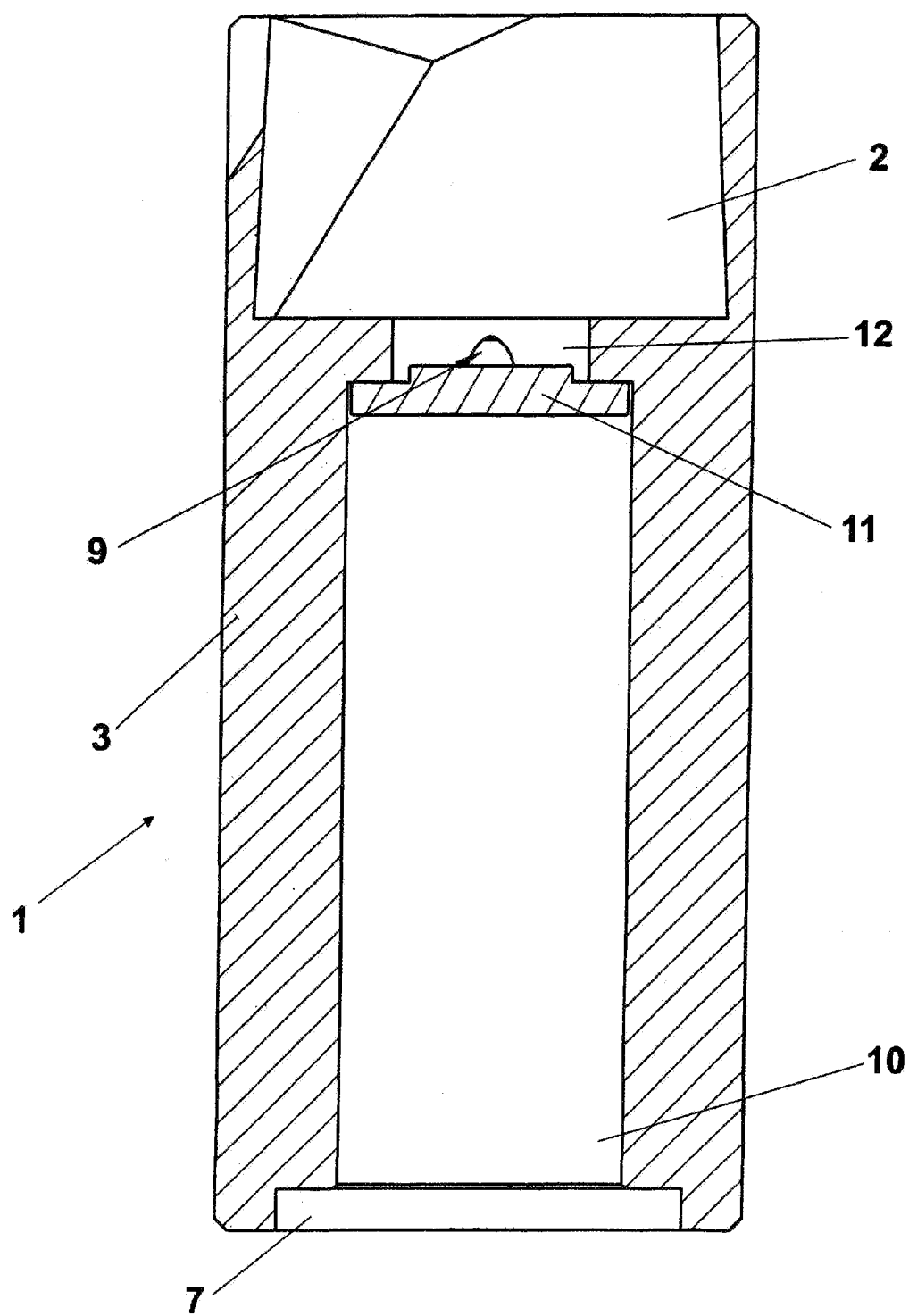

GROUND COMPOSITE BODY COMPRISING A GLASS BODY AND A PLASTIC

BACKGROUND OF THE INVENTION

I. Field of the Invention

The invention relates to a decorative composite body, comprising a glass body and a plastic partly enclosing the glass body, wherein part of the surface of the glass body is arranged on the outside of the decorative composite body, wherein at least two adjacent glass and plastic areas arranged on the outside of the composite body are ground in the composite state.

II. Description of Related Art

Items of jewellery which consist of a combination of a gemstone and a plastic are known per se in the state of the art, wherein in most cases the plastic is arranged in liquid form around the gemstone and then hardens.

An example of a composite body of this kind is shown in DE 35 03 941, where metal or plastic-type objects are introduced into a mould and project partly beyond the upper edge of the mould. The mould is filled with a liquid filler, wherein the surface is ground smooth after the hardening of the filler. The disadvantage is that glass gemstones are not taken into account, all the more so as these are particularly critical as regards their grindability.

DE 295 19 925 discloses an item of jewellery which comprises a gemstone consisting for example of glass which is poured into a hardenable composition. After hardening, this mass enclosing the gemstone can be ground. It is also provided to provide the mass together with the gem embedded therein with a glass sheath, wherein this glass sheath can then be ground. The disadvantage is that the hardened mass or the glass sheath have to be worked in a separate grinding process.

In the case of decorative composite bodies comprising a glass body which is at least partly embedded in plastic, there is the problem that air pockets and further visual defects can appear, which adversely affect the aesthetic appearance of the decorative composite body at the interfaces between glass body and plastic. Such defects or irregularities can occur during the bonding process between the plastic and the glass body if for example the glass body is poured into the plastic or cast together with the latter.

SUMMARY OF THE INVENTION

The object of the invention is therefore to avoid the above disadvantages and/or broaden the described field of use and to allow faster and simpler production of a composite decorative body without adversely affecting the bond between glass and plastic, wherein the external appearance of the decorative composite body is advantageously influenced.

This is achieved by a decorative composite body with a glass body and a plastic partly enclosing the glass body, according to the present invention.

By grinding in the composite state at least two adjacent glass and plastic areas, wherein the adjacent areas are arranged on the outside of the composite body, i.e. simultaneously, the production process can initially be accelerated, as only one grinding process and thus only one abrasive is needed for both adjacent areas, thus making it possible to dispense with a time-consuming change of different abrasive for plastic and glass.

In the above-mentioned state of the art, wherein the glass body and plastic have to be ground separately, it is particularly problematical to match ground areas of the glass body and ground areas of the plastic to each other. This decisive disadvantage can be overcome by the invention, whereby accurately fitting interfaces can easily be achieved. Because the interface between glass and plastic does not have to be taken into account, this results in a further simplification and acceleration of the grinding process. Furthermore a grinding process taking place when the glass body and the plastic are in the composite state results in a homogeneous surface roughness, in particular also in the interface area of glass and plastic, thereby for the most part avoiding formation of an edge along the interface. If, however, the areas were ground separately and subsequently joined together, such precision could be achieved only with difficulty. In particular it is possible to tell under the microscope because of the grinding marks resulting in the interface area between glass and plastic whether a grinding process has been carried out in bonded state or not. It is also possible to tell from the state of the bonded seam that a grinding process has taken place in bonded state of the composite body.

In order to allow a simultaneous grinding process of adjacent areas of glass and plastic, i.e. in the composite state, according to the invention, the material properties of the plastic must be matched to those of the glass, which are harder to influence. The relevant material properties of the plastic which have to be chosen for simultaneous grinding with the glass body include inter alia hardness. This hardness of the plastic must be chosen such that the glass body and the plastic can be jointly ground. Too great a hardness leads to a small removal of material compared with the glass, with the result that material cannot be evenly removed from the glass body and the plastic, or that a large amount of heat is generated during grinding of the plastic, with the result that the glass body may be damaged. Too small a hardness of the plastic on the other hand causes the plastic to be removed too rapidly in comparison to the glass body and an even removal of material from the plastic and the glass body is again impossible.

In this connection the thermal expansion coefficient as the temperature of the plastic rises is also important. As each grinding process is associated with generation of heat and a consequently increasing temperature of the material, too great an expansion of the plastic would be unfavourable, which in the worst case could mean the dissolution of the bond with the glass body. It is therefore important to keep this thermal expansion coefficient of the plastic as low as possible or match it to that of the glass body.

A particularly important characteristic of the grinding process is the friction coefficient between the abrasive used and the material to be ground. This may be both the coefficient of static friction and also the coefficient of sliding friction. It is important for a grinding process taking place in the composite state which does not adversely affect the bond between the glass body and the plastic that the friction coefficient between an abrasive with which the composite body is to be ground and the glass body essentially corresponds to the friction coefficient between this same abrasive and the plastic. The possibility of a simultaneous grinding of the glass body and of the plastic is guaranteed by such a matching of the friction coefficients.

The outer area of the composite body can be refined on the one hand by the grinding process and on the other hand by subsequent further working such as for example polishing, and matched to the consumer's wishes. Reworking is not possible for the bonding area between the glass body and the plastic inside the composite body. Here it may be that certain unattractive effects such as for example air pockets occur and are also visible. For this purpose it is provided to mirror those areas of the glass body which are arranged inside the composite body and which are adjacent to areas of plastic, for example by vapour deposition of a reflective layer on the glass body, before the composite body is formed. The glass body thus comprises a mirroring at the interface or at least at areas of the interface with the plastic. The aesthetically disadvantageous air pockets or a rough plastic-interface can therefore no longer be recognized, wherein the refractive and reflective properties of the glass body are preserved or even improved.

The transition between plastic and the glass may be regular and smooth in particular if the glass body has been correspondingly machined before the attachment of the plastic. However it can also be provided that this transition is formed irregularly, for example jaggedly, whereby it is possible to achieve further refractive and reflective properties at the unmirrored areas.

Further advantageous embodiments of the invention are defined in the dependent claims or explained in more detail below.

In a preferred embodiment of the invention all the adjacent and ground areas arranged on the outside are ground in the composite state. This can make it possible to further accelerate the production process and to carry out the machining of the composite body in a single grinding process. In particular the composite body, comprising the glass body and the plastic, can be produced without account being taken of the external shape and then ground to the desired shape in a single grinding process. However, it can be provided that this single grinding process comprises different steps in which, for example, the roughness of the abrasive decreases and the surface of the composite body thereby becomes increasingly smoother. However, it is important that in each of these steps the adjacent areas of glass and plastic which are subjected to a grinding process are ground in the composite state.

In a preferred embodiment of the invention it is provided that the surface of the composite body has facetted ground areas, which can give rise to particularly attractive visual effects and can for example produce a gemstone. It is provided that at least one facet comprises plastic areas and glass body areas which are ground in the composite state. It can however also be provided to form the composite body and/or the glass body as essentially cuboid. It is advantageous that the basic shape of the composite body is of little significance, as a cuboid composite body can be produced more simply in a grinding process.

The actual plastics used are of course important for the material properties of the plastic. It is preferred to provide a single- or multi-component casting resin as essential constituent of the plastic. These include for example polyester resins, epoxy resins, polyurethane resins, acrylic resins, vinylester resins or also hybrid resins.

The abovementioned casting resins can serve as basic substance of the plastic. In order to obtain the desired material properties, in particular the desired surface properties it is provided in a particularly preferred embodiment of the invention that the plastic comprises fillers which serve to change the material properties, for example to reduce the thermal expansion coefficient. These fillers include glass powders, beads, i.e. glass spheres or glass beads, micro balloons, quartz powders, stone dusts, limestone flours, aluminium trihydrate, metal powder etc.

It can further be provided that additives are added to the plastic which serve in particular to improve deaeration, flow properties, wettability, adhesion or to reduce viscosity. These properties concern on the one hand the production of the plastic and on the other hand the production of the bond between the plastic and the glass body.

In a preferred embodiment of the invention it is provided that the plastic comprises effect substances which serve to achieve certain visual effects. These effect substances include for example pigments such as colour pigments, effect pigments, so-called "after glowing pigments", such as e.g. mother-of-pearl or fluorescent pigments, with which it is possible to achieve an illumination effect which starts late or lasts longer.

During the formation of the plastic it can be provided to make the plastic opaque in basically any colour. It can however also be provided to use a plastic, which is at least translucent in order for example to illustrate the effects produced by the effect substances.

In principle any shapes of the composite body are possible in particular through a grinding process carried out in the composite state. In an embodiment of the invention undercuts of plastic by the glass body are possible. Particularly attractive visual effects can be achieved thereby.

In an embodiment it is provided to provide the composite body with a lighting means. This lighting means can be arranged in the area of the interface between glass body and plastic inside the decorative composite body. Thus the composite body serves, particularly if it has visually attractive ground areas, as an attractive lighting appliance, in particular for background lighting. In this case it is particularly preferred to use one or more light-emitting diodes as a lighting means, as these are characterized by a great variability with respect to their emitted spectrum, a long life, low energy consumption, compact structure and—particularly important for a composite body of this type—low heat generation.

It can be provided that a bore leading to the lighting means, whereby the lighting means can be supplied with electricity and where the necessary connecting cables or external power sources such as for example batteries or accumulators can be arranged, is arranged in the composite body. Thus it is possible to arrange a lighting appliance in the composite body.

For this purpose a metal sleeve can be arranged in the plastic, in which the one or more lighting means, as well as their means of power supply and further electronic or electric components, i.e. a lighting appliance, are housed.

The invention furthermore relates to a method for producing a decorative composite body, in particular a composite body as described above, wherein a glass body is introduced into a mould and then filled with a liquid, but hardenable plastic. This plastic hardens forming a bond with the glass body. After hardening of the plastic and formation of the bond, at least two adjacent glass and plastic areas arranged on the outside of the composite body are then ground in the composite state. It can however also be provided that several or all adjacent glass and plastic areas arranged on the outside of the composite body are ground in the composite state. The mould itself can be used for further casting processes or itself be part of the composite body.

The advantages which result from a grinding process of this kind taking place in the composite state have already been mentioned above.

Particularly attractive effects result if, in an embodiment of the method according to the invention, the composite body is ground at least partly faceted.

In order to allow a simultaneous grinding process, i.e. one taking place in the composite state, the material properties of the plastic must be matched with those of the glass. It can be provided that the plastic comprises a single- or multi-component casting resin which is poured in liquid form into the mould into which the glass body has been introduced. In order to control the material properties it can be provided to add fillers to the plastic, with which desired surface properties and further desired material properties are achieved, while it is still in liquid form. These include inter alia a desired hardness, in particular surface hardness, a machining property to be achieved or a low thermal expansion coefficient as the temperature of the plastic increases. These fillers include glass powders, beads, i.e. glass spheres or glass beads, micro balloons, quartz powders, stone dusts, limestone flours, aluminium trihydrate, metal powder etc.

In an embodiment of the method according to the invention it is provided to add further additives to the not yet hardened plastic in order to improve the processability of the plastic. These include additives for improving deaeration, thus reducing the formation of air pockets during hardening of the plastic, improving flow properties, thus improving the even filling of the mould when pouring in the plastic, improving wettability, thus better covering the surface of the glass body which is not to be arranged on the outside of the composite body, improving adhesion thus allowing an improved bond between glass body and plastic, or reducing viscosity.

Furthermore it can also be provided to add effect substances to the not-yet-hardened plastic. These effect substances serve mainly to achieve visual effects, whereby the composite body according to the invention appears more attractive. These effect substances include inter alia pigments such as colour pigments, effect pigments or "after glowing pigments", such as e.g. mother-of-pearl or fluorescent pigments.

The bonding of the glass body to the plastic takes place as the liquid plastic which is poured into the mould with the glass body hardens. The adhesion of the plastic to the glass body, after hardening, results in the composite body according to the invention. Depending on the plastic used, the hardening takes place under many different conditions. In the case of a multi-component casting resin it can be provided to allow the plastic to harden at room temperature over a longer period. In particular in the case of a single-component casting resin it can however also be provided to allow the hardening to occur at an increased temperature between 20° and 200° C. It is also conceivable to allow the hardening process to proceed in different steps at different temperatures or to control the hardening process by irradiation with UV radiation. This applies in particular in the case of UV-hardenable plastics.

To arrange a bore it is provided in an embodiment of the method according to the invention, before the pouring in of the liquid plastic, to arrange a metal sleeve on the glass body which, after the hardening of the plastic, can remain therein and can serve as a recess to house a lighting means or further associated components, i.e. a lighting appliance.

BRIEF DESCRIPTION OF THE DRAWINGS

Further details and advantages of the present invention are explained below on with the help of the description of the figures and reference to the drawings.

FIG. 4 is a cross-section through a composite body according to the invention with a lighting appliance arranged therein;

DETAILED DESCRIPTION OF THE INVENTION

Figure 1A:
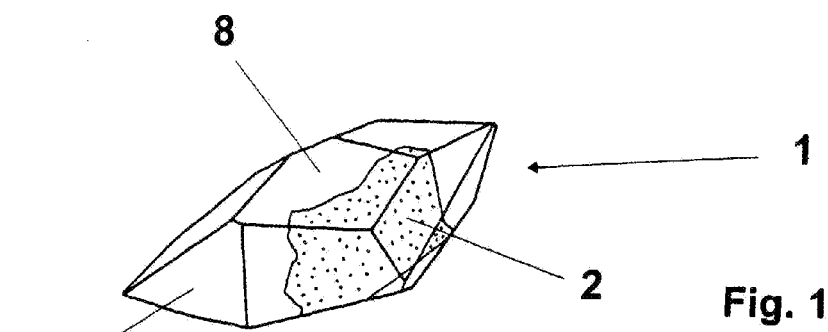
FIGS. 1a to 1d show three perspective views as well as a side view of an embodiment of a composite body according to the invention.
Figure 1B:
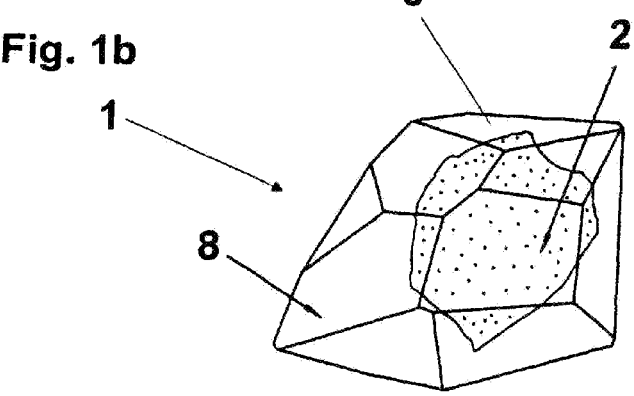
Figure 1D:
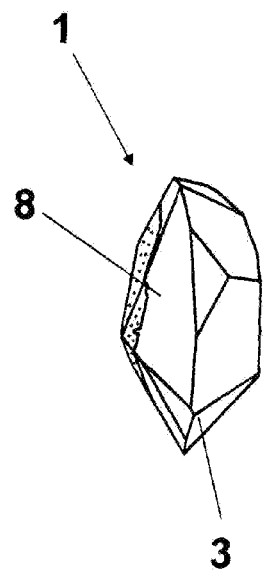
Figure 1C:
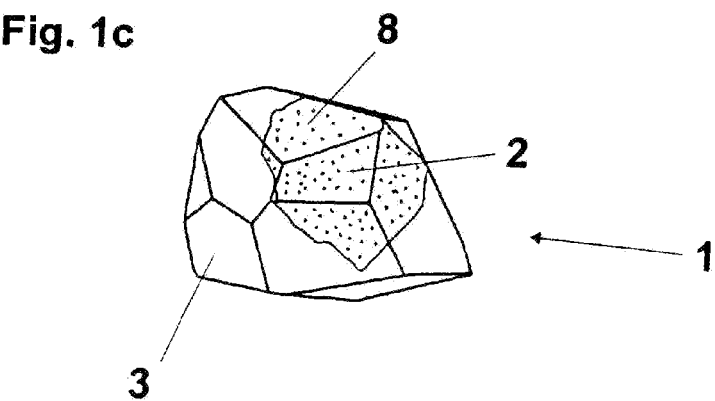

FIGS. 1a to 1c show perspective views of a first embodiment of a composite body 1 according to the invention, the outer surface of which is ground into irregular facets. Part of the surface of the glass body 2 is arranged on the outside of the decorative composite body 1. These areas are shown dotted. Those areas of the outside of the composite body 1 which consist of plastic 3 are not dotted. The boundary running over the outside of the composite body 1 between plastic 3 and glass body 2 is curved, i.e. the interface area between plastic 3 and glass body 2 is not smooth and regular. At least those facets in which both plastic 3 and also glass 2 occur and are adjacent are the areas 8 according to the invention which are ground in the composite state. In the embodiment example shown here all the areas, i.e. all the facets of the composite body 1 are ground in the composite state. FIG. 1d shows a side view of the represented composite body 1. It can be clearly seen that the plastic 3 at least partly encloses the glass body 2.

Figure 2A:
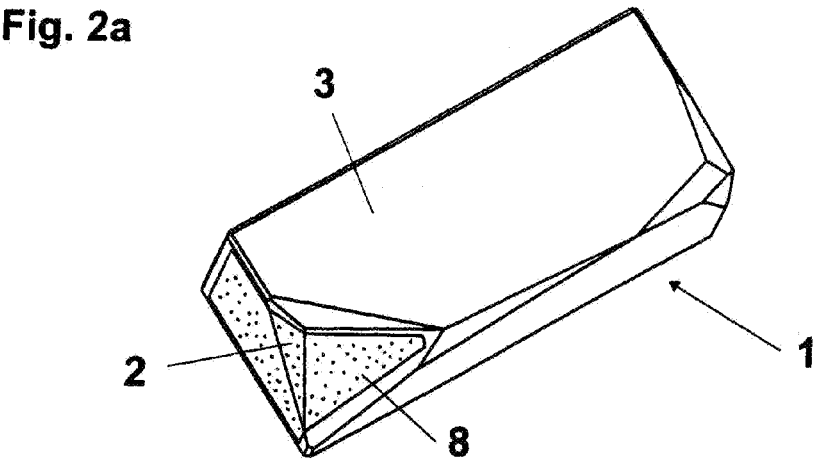
FIGS. 2a to 2c show two perspective views as well as a side view of a further embodiment of a composite body according to the invention.
Figure 2B:
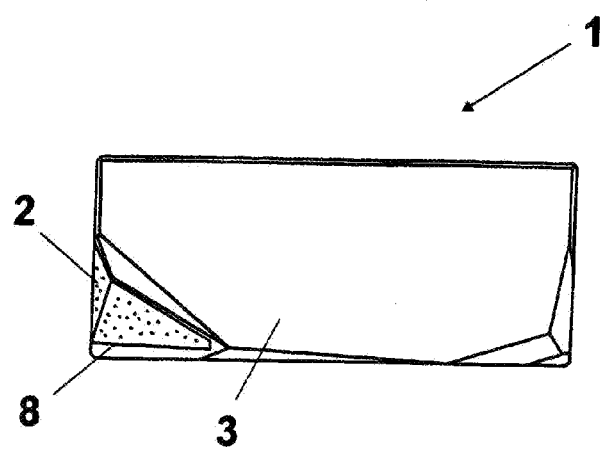
Figure 2C:
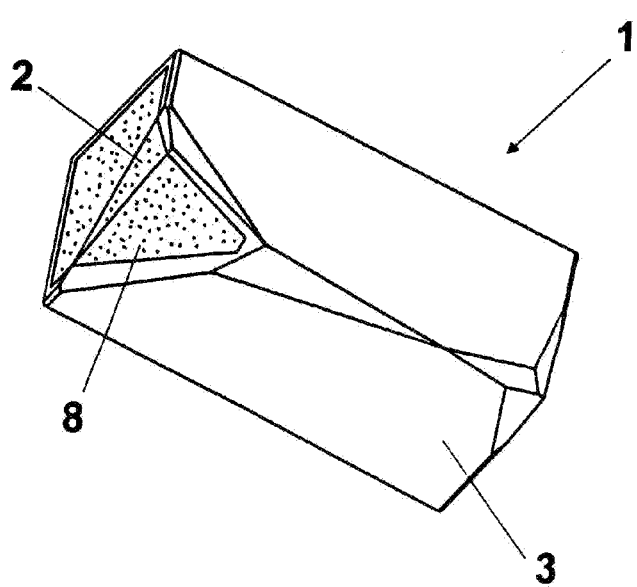

FIGS. 2a and 2c show perspective views of a further embodiment of a composite body 1 according to the invention which is formed as essentially cuboid. Those areas of the outside of the composite body 1 which consist of glass 2 are again represented dotted, while the areas of the outside of the composite body 1 consisting of plastic 3 are not dotted. At least the ground corner shown, where both plastic 3 and also glass 2 are to be found and are adjacent, represents an area 8 which is ground in the composite state of the composite body 1. Although the ground areas consisting purely of plastic, for example at the end of the composite body 1 opposite the glass body, could in principle already be ground before the bonding with the glass body 2, it is preferred to also grind these areas in the composite state. FIG. 2b shows a corresponding side view of this embodiment of the composite body 1.

Figure 3A:
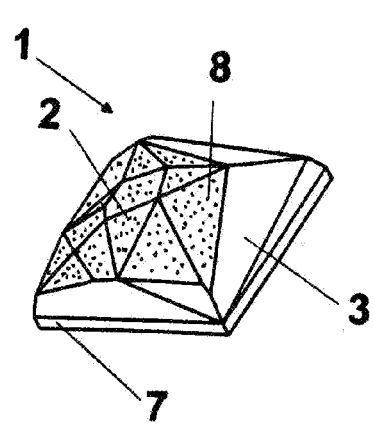
FIGS. 3a to 3d show two perspective views, a side view as well as a top view of another further embodiment of a composite body according to the invention.
Figure 3B:
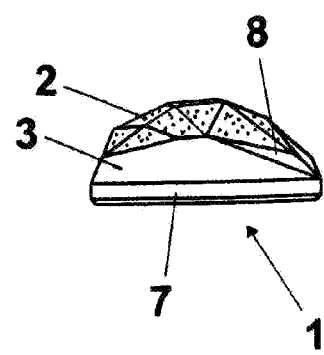
Figure 3C:
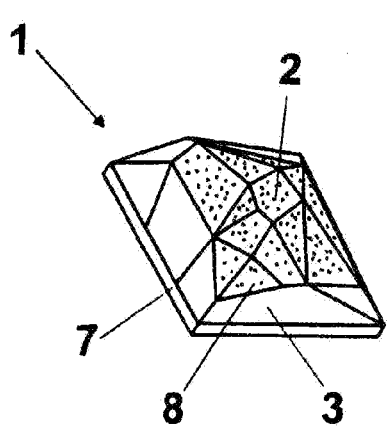
Figure 3D:
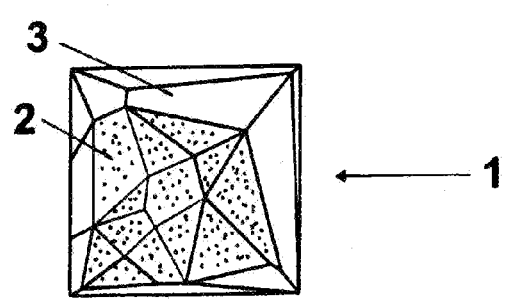

A further embodiment of a composite body 1 according to the invention is shown in FIGS. 3a to 3d, wherein FIGS. 3a and 3c represent perspective views, while FIG. 3b represents a side view and FIG. 3d a top view. A base plate 7 is arranged on the underside of the composite body 1. This base plate 7 can consist of the same plastic 3 as the composite body. It can however also be provided that the base plate 7 consists of metal, a different plastic or glass. The areas arranged above the base plate 7 are ground in facets, wherein the facets are irregular. The areas of glass 2 arranged on the outside of the composite body 1 are again represented dotted. The whole of the composite body 1 is ground in bonded state with the result that adjacent areas 8 of glass and plastic are again present which are ground in the composite state.

FIG. 4 shows a cross-section through a further embodiment of a composite body 1, wherein the plastic areas 3 are represented hatched, while the glass areas 2 are not hatched. A base plate 7 is arranged on the underside of the composite body 1, i.e. on the side opposite the glass body 2. Arranged in the plastic 3 are a recess 12 and a metal sleeve 10, the inside of which at least partly forms the recess 12. A lighting means 9 in the form of a light-emitting diode which is arranged on a printed circuit board 11 is arranged at the end of the metal sleeve 10 opposite the base plate 7. Further electronic or electric components as well as power supply means, such as for example a battery, are known per se in the state of the art and are not shown in this figure in order to simplify the representation. The electronic components can in particular comprise a regulating and/or control device with which the colour and/or the brightness of the emitted light can be regulated or controlled. The lighting means 9 can also comprise several, in particular different-coloured light-emitting diodes.

Figure 5A:
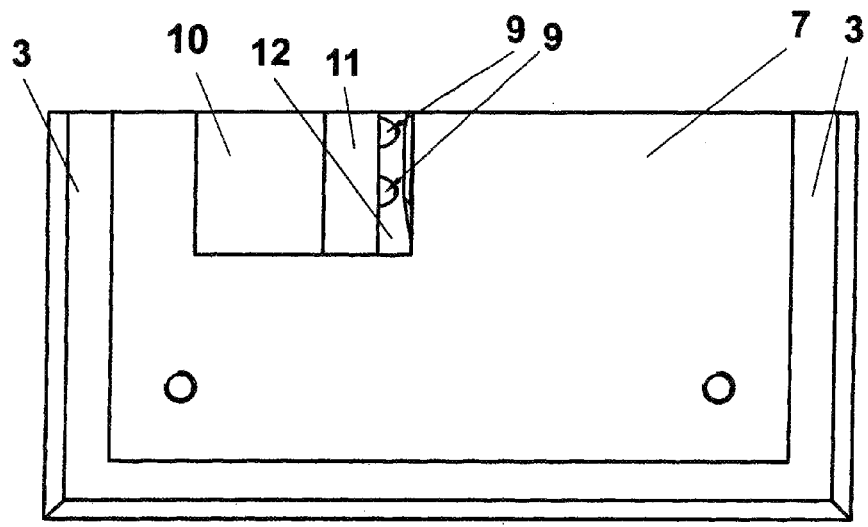
FIGS. 5a and 5b show a view from below as well as a cross-section through a further embodiment of a composite body according to the invention with a lighting appliance arranged therein.

FIG. 5*a* shows a view from below of a further embodiment of a composite body 1, wherein the base plate 7 is transparent and bordered by plastic areas 3. A metal sleeve 10 as well as a printed circuit board 11 with arranged lighting means 9, in this case two light-emitting diodes, can be seen through the base plate 7. Part of the also visible recess 12 is designed as a cavity, with the result that the heat produced by the lighting means 9 can be dissipated.

Figure 5B:
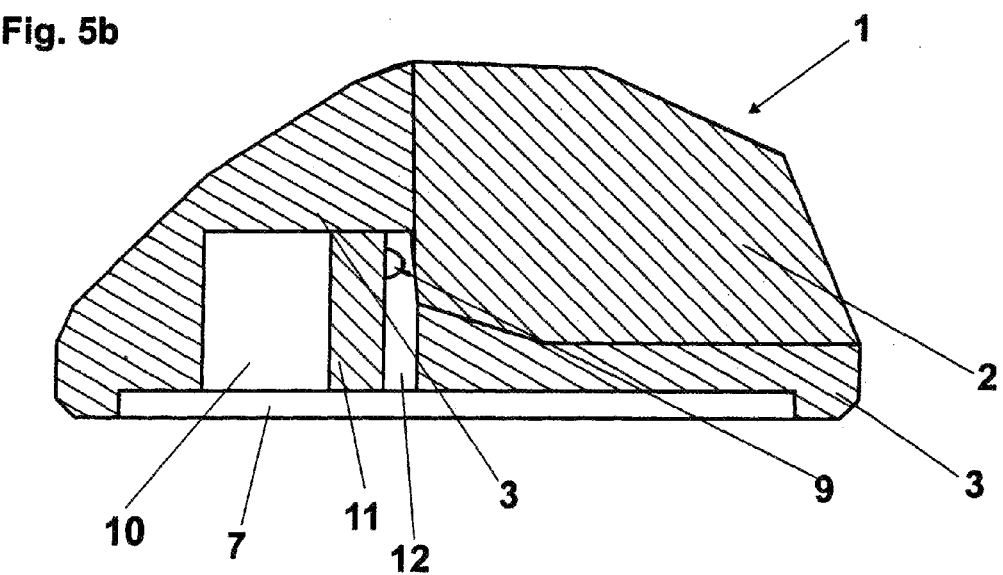

In the cross-section representation of FIG. 5*b* the embodiment of the composite body 1 represented in FIG. 5*a* is shown, wherein the glass body 2 and the areas consisting of plastic 3 are visible. The interface between glass 2 and plastic 3 is smooth and regular in this case.

Figure 6A:
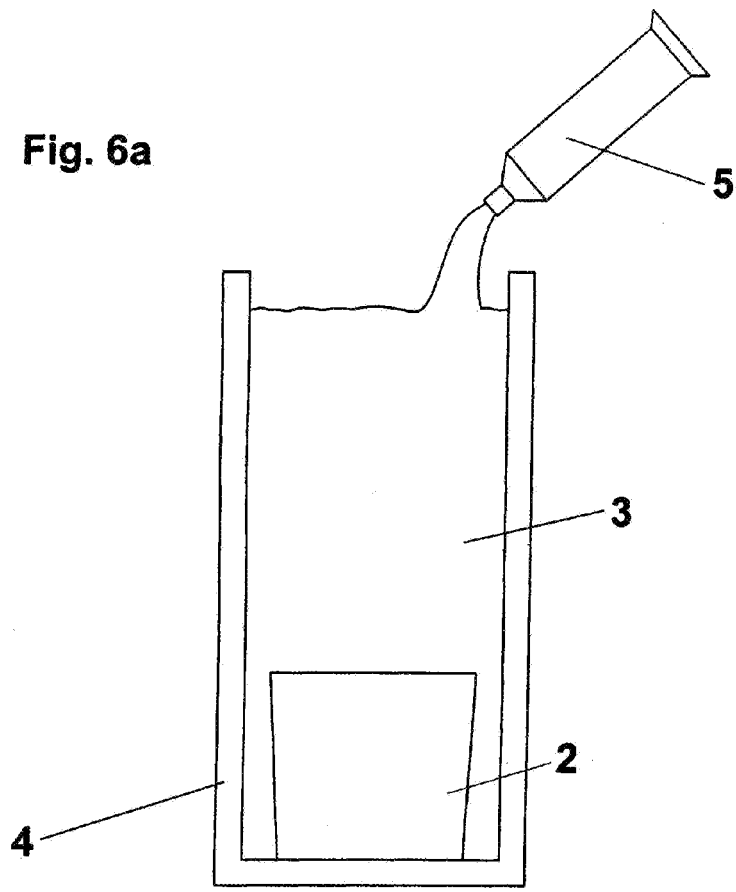
FIGS. 6a and 6b are schematic representations showing the production method of a composite body according to the invention.

FIG. 6*a* shows a schematic representation of the method according to the invention for producing a composite body 1. A glass body 2 is housed in a casting mould 4 which can for example consist of metal. Plastic 3 in liquid state is poured into the casting mould 4 with a casting tool 5. The plastic 3 can comprise for example a single- or multi-component casting resin. After the plastic 3 is poured in, it hardens optionally accompanied by influencing of the outside temperature, and the now bonded composite body 1, which consists of the glass body 2 and plastic 3, can now be ground jointly.

Figure 6B:
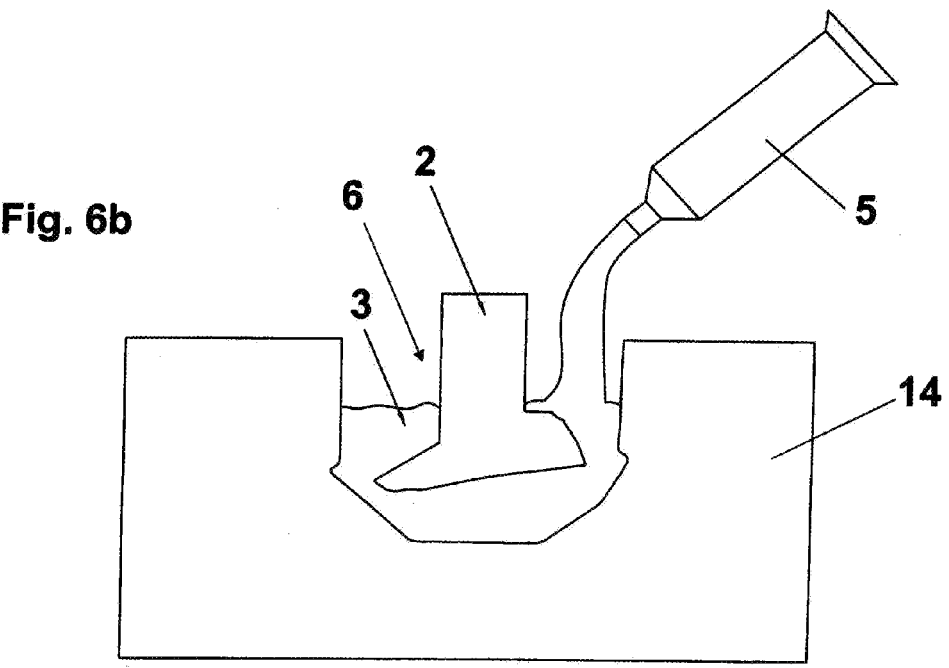

FIG. 6*b* represents a further embodiment of the method according to the invention. A mould 14, which, at the end of the production method, forms an integral component of the composite body 1, has a recess 6, in which a glass body 2, the surface of which is partly irregular, is arranged. A plastic 3 in liquid state is again poured into the recess 6 with a casting tool 5. The casting mould 14 can consist of metal, of glass or also of plastic. After the plastic 3 has hardened and bonded with the glass body 2, areas 8 on the outside of the composite body 1 which consist of glass 2 and plastic 3 are ground in the composite state.

Figure 7A:
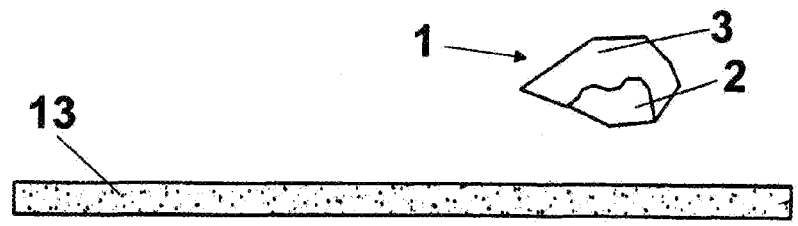
FIGS. 7a to 7c are schematic representations showing the joint grinding process of the glass and plastic areas.
Figure 7B:
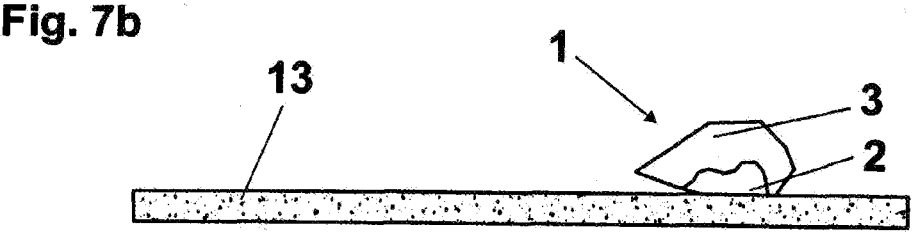
Figure 7C:
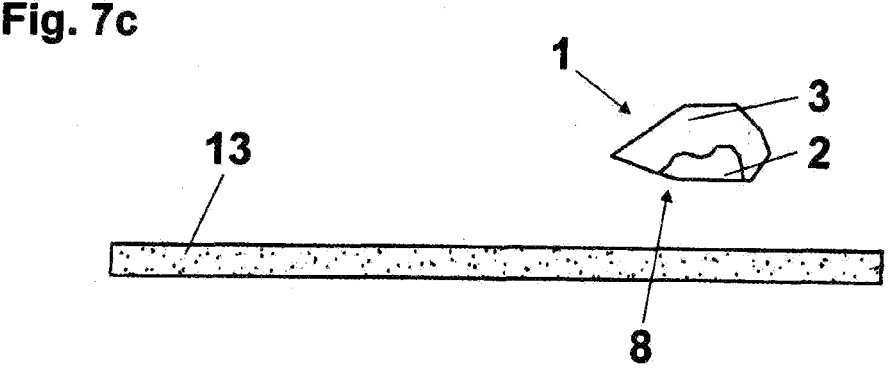

FIG. 7*a* shows the grinding process schematically, wherein the composite body 1, comprising a glass body 2 and plastic areas 3, are ground in the composite state. The abrasive 13 is in this case a rotating grinding disc, wherein the rotational axis is arranged perpendicular to the plane of the disc. FIG. 7*b* shows how the composite body 1 is forced onto the rotating grinding disc 13, wherein as a result of the grinding action adjacent areas 8 of glass 2 and plastic 3 are ground jointly and simultaneously. FIG. 7*c* shows the end of the grinding process where the composite body is again lifted from the grinding disc 13 and areas 8 which are ground simultaneously in the composite state and comprise both glass 2 and plastic 3 now are present in the composite body 1.

Figure 8A:
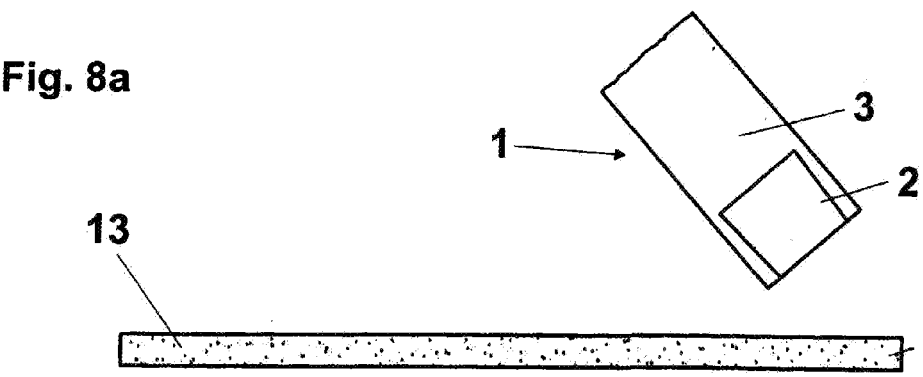
FIGS. 8a to 8c are further schematic representations showing the joint grinding process of the glass body and the plastic.
Figure 8B:
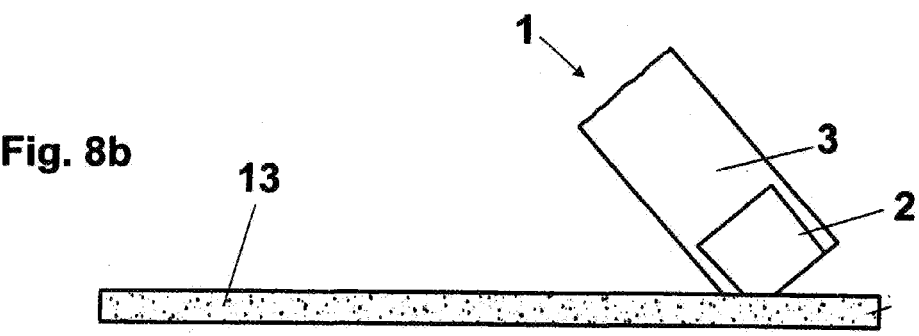
Figure 8C:
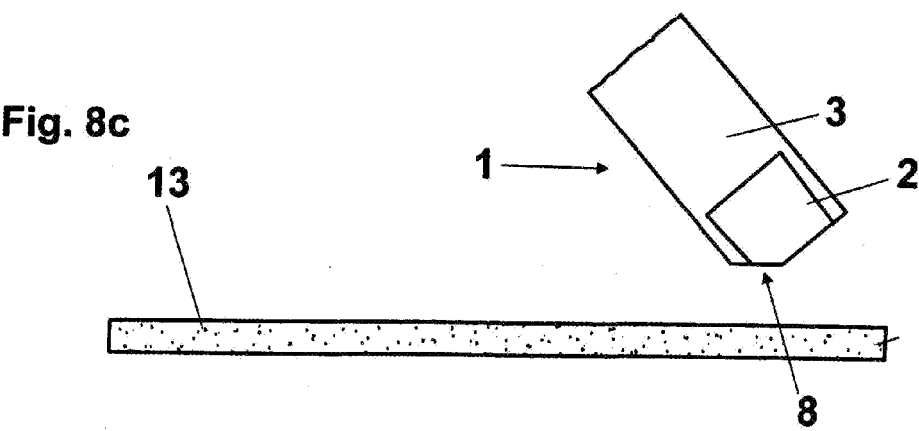

FIGS. 8*a* to 8*c* show a similar grinding process, wherein in this case an essentially cuboid composite body 1 consisting of a glass body 2 and plastic areas 3 is ground in the composite state, with the result that, as shown in FIG. 8*c*, areas 8 of glass 2 and plastic 3 are present, which are ground in the composite state. FIG. 8*b* again shows how adjacent areas 8 of glass 2 and plastic 3 are ground jointly and simultaneously, wherein the glass body 2 and the plastic 3 have already been bonded into a composite body 1 before the grinding process.

The mirroring which is to be provided at least partly on areas of the glass body adjacent to the plastic which are arranged in the interior of the decorative composite body is preferably provided by a reflective layer arranged on the outer wall of the glass body in said areas. It may also be provided that the entire outer surface of the glass body, which is arranged in the interior of the composite body, i.e. which is surrounded by plastic is being mirrored. The mirroring is may be provided by a vapour-deposited reflective layer. On the figures itself the mirroring which may be embodied just as a reflective layer itself is not explicitly shown.

It is understood that the decorative composite body according to the invention and the method according to the invention are not limited to the embodiment examples represented in particular in the figures or taken to be limited thereby. In particular the grinding process according to the invention is not limited to a specific surface roughness to be achieved, but comprises the whole range of coarse grinding with a high degree of material removal up to a smooth surface grinding.

The chosen positions indicated in the description, such as e.g. above, below etc. also relate to the directly described as well as represented figures and are to be transferred accordingly to the new position in the event of a change in position.

The invention claimed is:

1. A decorative composite body, comprising:
 a glass body; and
 a plastic partly enclosing said glass body,
 wherein a surface of said glass body is exposed at an exterior surface of said decorative composite body,
 wherein a friction coefficient between a grinding abrasive and said glass body essentially corresponds to a friction coefficient between said abrasive and said plastic,
 wherein at least a part of said exposed surface of said glass body and a part of said plastic are adjacent to each other at said exterior surface of said composite body and have been subjected to simultaneous grinding in a composite state to form a first face,
 wherein a second face is formed of simultaneously ground glass body and another part of said plastic adjacent to each other, an interconnection of said first face and said second face forming an obtuse angle, and
 wherein said glass body includes surfaces which are arranged in an interior of said composite body and which are adjacent to and enclosed by portions of said plastic at said interior of said composite body, and wherein said surfaces of said glass body which are adjacent to and enclosed by portions of said plastic at said interior of said composite body are at least partly mirrored.

2. The decorative composite body according to claim 1, wherein all parts of said exposed surface of said glass body and all parts of said plastic adjacent thereto at said exterior surface of said composite body have been subjected to simultaneous grinding in the composite state.

3. The decorative composite body according to claim 1, wherein said composite body has a surface which is at least partly ground in facets.

4. The decorative composite body according to claim 1, wherein said decorative composite body or said glass body is essentially cuboid.

5. The decorative composite body according to claim 1, wherein said plastic comprises a single- or multi-component casting resin.

6. The decorative composite body according to claim 1, wherein said plastic comprises fillers which change the material properties of the plastic.

7. The decorative composite body according to claim 1, wherein said plastic comprises additives for improving at least one of the properties of the group consisting of deaeration, flow properties, wettability, and adhesion.

8. The decorative composite body according to claim 1, wherein said plastic comprises additives to reduce viscosity.

9. The decorative composite body according to claim 1, wherein said plastic comprises effect substances.

10. The decorative composite body according to claim 1, wherein said plastic is opaque.

11. The decorative composite body according to claim 1, wherein said plastic is at least partly undercut by said glass body.

12. A decorative composite body, comprising:
a glass body; and
a plastic partly enclosing said glass body,
wherein a surface of said glass body is exposed at an exterior surface of said decorative composite body,
wherein the plastic is chosen such that its hardness is similar to that of the glass body,
wherein at least a part of said exposed surface of said glass body and a part of said plastic are adjacent to each other at said exterior surface of said composite body and have been subjected to simultaneous grinding in a composite state to form a first face,
wherein a second face is formed of simultaneously ground glass body and another part of said plastic adjacent to each other, an interconnection of said first face and said second face forming an obtuse angle, and
wherein said glass body includes surfaces which are arranged in an interior of said composite body and which are adjacent to and enclosed by portions of said plastic at said interior of said composite body, and wherein said surfaces of said glass body which are adjacent to and enclosed by portions of said plastic at said interior of said composite body are at least partly mirrored.

13. The decorative composite body according to claim 12, wherein all parts of said exposed surface of said glass body and all parts of said plastic adjacent thereto at said exterior surface of said composite body have been subjected to simultaneous grinding in the composite state.

14. The decorative composite body according to claim 12, wherein said composite body has a surface which is at least partly ground in facets.

15. The decorative composite body according to claim 12, wherein said plastic comprises a single- or multi-component casting resin.

16. The decorative composite body according to claim 12, wherein said plastic comprises fillers which change the material properties of the plastic.

17. The decorative composite body according to claim 12, wherein said plastic comprises additives for improving at least one of the properties of the group consisting of deaeration, flow properties, wettability, and adhesion, or for reducing viscosity.

18. The decorative composite body according to claim 12, wherein said plastic comprises effect substances.

19. The decorative composite body according to claim 12, wherein said plastic is opaque.

20. The decorative composite body according to claim 12, wherein said plastic is at least partly undercut by said glass body.

* * * * *